(12) United States Patent
Zhang et al.

(10) Patent No.: US 9,842,148 B2
(45) Date of Patent: Dec. 12, 2017

(54) METHOD FOR FAILURE-RESILIENT DATA PLACEMENT IN A DISTRIBUTED QUERY PROCESSING SYSTEM

(71) Applicant: Oracle International Corporation, Redwood Shores, CA (US)

(72) Inventors: Gong Zhang, Belmont, CA (US); Sabina Petride, Tracy, CA (US); Boris Klots, Belmont, CA (US); Sam Idicula, Santa Clara, CA (US); Nipun Agarwal, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 380 days.

(21) Appl. No.: 14/704,825

(22) Filed: May 5, 2015

(65) Prior Publication Data

US 2016/0328456 A1  Nov. 10, 2016

(51) Int. Cl.
G06F 17/30 (2006.01)

(52) U.S. Cl.
CPC .............................. G06F 17/30545 (2013.01)

(58) Field of Classification Search
CPC ........... G06F 17/30545; G06F 17/3033; G06F 17/30283; G06F 17/30312;

(Continued)

(56) References Cited

U.S. PATENT DOCUMENTS 5,721,909 A   2/1998   Oulid-Aissa et al.
5,909,570 A   6/1999   Webber
(Continued)

FOREIGN PATENT DOCUMENTS

GB   2459354   10/2009
WO   WO 98/44400   10/1998

OTHER PUBLICATIONS

Cormen et al., "Introduction to Algorithms", Third Edition, The MIT Press, http://mitpress.mit.edu/books/introduction-algorithms, dated Jul. 2009, 2 pages.

(Continued)

*Primary Examiner* — Evan Aspinwall
(74) *Attorney, Agent, or Firm* — Hickman Palermo Becker Bingham LLP

(57) ABSTRACT

Herein is described a data placement scheme for a distributed query processing systems that achieves load balance amongst the nodes of the system. To identify a node on which to place particular data, a supervisor node performs a placement algorithm over the particular data's identifier, where the placement algorithm utilizes two or more hash functions. The supervisor node runs the placement algorithm until a destination node is identified that is available to store the data, or the supervisor node has run the placement algorithm an established number of times. If no available node is identified using the placement algorithm, then an available destination node is identified for the particular data and information identifying the data and the selected destination node is included in an exception map. Most data may be located by any node in the system based on the node performing the placement algorithm for the required data.

20 Claims, 4 Drawing Sheets

(58) Field of Classification Search
CPC ......... G06F 17/30949; G06F 17/30067; G06F 17/30091; G06F 17/30097
USPC ........................................................ 707/747
See application file for complete search history.

(56) References Cited

U.S. PATENT DOCUMENTS

| | | | |
|---|---|---|---|
| 6,134,549 | A | 10/2000 | Regnier et al. |
| 6,272,523 | B1 | 8/2001 | Factor |
| 6,310,883 | B1 | 10/2001 | Mann et al. |
| 6,826,753 | B1 | 11/2004 | Dageville et al. |
| 6,880,002 | B2 | 4/2005 | Hirschfeld et al. |
| 7,225,240 | B1 | 5/2007 | Fox et al. |
| 7,386,849 | B2 | 6/2008 | Dageville et al. |
| 7,493,400 | B2 | 2/2009 | Loaiza et al. |
| 7,702,676 | B2 | 4/2010 | Brown et al. |
| 7,788,220 | B1* | 8/2010 | Auchmoody ..... G06F 17/30067 707/609 |
| 7,805,407 | B1 | 9/2010 | Verbeke et al. |
| 7,809,690 | B2 | 10/2010 | Pommerenk et al. |
| 7,814,065 | B2 | 10/2010 | Chan et al. |
| 8,065,284 | B2 | 11/2011 | Kaplan |
| 8,117,488 | B2 | 2/2012 | Chan et al. |
| 8,271,468 | B1 | 9/2012 | Peddy et al. |
| 8,527,473 | B1 | 9/2013 | Brown et al. |
| 8,540,556 | B2 | 9/2013 | Hiddink et al. |
| 8,572,091 | B1* | 10/2013 | Sivasubramanian G06F 17/3033 707/747 |
| 2001/0023476 | A1 | 9/2001 | Rosenzweig |
| 2002/0087798 | A1 | 7/2002 | Perincherry et al. |
| 2002/0116457 | A1 | 8/2002 | Eshleman et al. |
| 2002/0178276 | A1 | 11/2002 | McCartney et al. |
| 2003/0046270 | A1 | 3/2003 | Leung et al. |
| 2003/0081748 | A1 | 5/2003 | Lipinski |
| 2003/0204505 | A1 | 10/2003 | Cotner et al. |
| 2003/0210694 | A1 | 11/2003 | Jayaraman et al. |
| 2004/0030801 | A1 | 2/2004 | Moran et al. |
| 2004/0205310 | A1 | 10/2004 | Yamagami |
| 2004/0243647 | A1 | 12/2004 | Oheda |
| 2004/0249788 | A1 | 12/2004 | Dant |
| 2005/0097187 | A1 | 5/2005 | Thompson et al. |
| 2005/0114309 | A1 | 5/2005 | Dettinger et al. |
| 2005/0228822 | A1 | 10/2005 | Wason |
| 2006/0031243 | A1 | 2/2006 | Boyle et al. |
| 2006/0036989 | A1 | 2/2006 | Chaudhuri et al. |
| 2006/0064478 | A1 | 3/2006 | Sirkin |
| 2006/0218123 | A1 | 9/2006 | Chowdhuri et al. |
| 2006/0242356 | A1 | 10/2006 | Mogi et al. |
| 2006/0265420 | A1 | 11/2006 | Macnaughton et al. |
| 2007/0005786 | A1 | 1/2007 | Kumar et al. |
| 2007/0022100 | A1 | 1/2007 | Kitsuregawa et al. |
| 2007/0073829 | A1 | 3/2007 | Volodarsky et al. |
| 2007/0245088 | A1 | 10/2007 | Mogi et al. |
| 2008/0162583 | A1 | 7/2008 | Brown |
| 2009/0034537 | A1 | 2/2009 | Colrain et al. |
| 2009/0144338 | A1 | 6/2009 | Feng et al. |
| 2009/0182718 | A1 | 7/2009 | Waclawik et al. |
| 2009/0198736 | A1 | 8/2009 | Shen et al. |
| 2009/0216438 | A1 | 8/2009 | Shafer |
| 2010/0114870 | A1 | 5/2010 | Al-Omari et al. |
| 2010/0174863 | A1 | 7/2010 | Cooper et al. |
| 2011/0153826 | A1 | 6/2011 | Ananthanarayanan et al. |
| 2011/0191624 | A1 | 8/2011 | Rodgers et al. |
| 2011/0276579 | A1 | 11/2011 | Colrain et al. |
| 2012/0166483 | A1 | 6/2012 | Choudhary et al. |
| 2012/0173774 | A1 | 7/2012 | Lee et al. |
| 2014/0101100 | A1 | 4/2014 | Hu et al. |
| 2016/0117357 | A1 | 4/2016 | Colrain et al. |

OTHER PUBLICATIONS

DeCandia et al., "Dynamo: Amazon's Highly Available Key-Value Store", *SOSP* '07, Oct. 14-17, 2007, Stevenson, Washington, USA. Copyright 2007 ACM 978-1-59593-591-05/070010, 16 pages.

Lakshman et al., "Cassandra—A Decentralized Structured Storage System", vol. 44, Issue 2, dated Apr. 2010, 6 pages.

Schmuck et al., "GPFS: A Shared-Disk File System for Large Computing Clusters", Proceedings of the FAST'02 Conference on File and Storage Technologies. Monterey, California, USA: USENIX. pp. 231-244. ISBN 1-880446-03-0. Retrieved Jan. 18, 2008, 15 pages.

Shafer et al., "The Hadoop Distributed Filesystem: Balancing Portability and Performance", In the Proceedings of the 26th IEEE Transactions on Computing Symposium on Mass Storage Systems and Technologies (MSST'10), dated May 2010, 12 pages.

Stoica et al., "Chord: A Scalable Peer-to-Peer Lookup Service for Internet Applications", ACM, SIGCOMM, Computer Communication Review 31, dated Aug. 2001, 12 pages.

U.S. Appl. No. 12/776,341, filed May 7, 2010, Office Action, dated Mar. 16, 2012.

U.S. Appl. No. 12/776,341, filed May 7, 2010, Final Office Action, dated Jul. 17, 2012.

U.S. Appl. No. 12/776,341, filed May 7, 2010, Office Action, dated Sep. 27, 2013.

U.S. Appl. No. 12/776,341, filed May 7, 2010, Advisory Action, dated May 6, 2014.

U.S. Appl. No. 12/776,341, filed May 7, 2010, Office Action, dated Jan. 23, 2015.

U.S. Appl. No. 12/776,341, filed May 7, 2010, Final Office Action, dated Jan. 29, 2014.

U.S. Appl. No. 12/776,341, filed May 7, 2010, Notice of Allowance, dated Jun. 15, 2015.

* cited by examiner

FIG. 3

```
Allocate_du_to_node (Data_Unit_ID du_id, int NUM_DOMAIN,
   int NUM_NODES_PER_DOMAIN, int T)
{
            du_hid=hash(du_id)
            domain_id=mod(du_id, NUM_DOMAIN);

num_nodes=NUM_NODES_DOMAIN(domain_id);
            num_iter=T;

while (true)
            {
                IF(num_iter==0)
                    reject the allocation request;
                    unload and report error
             ENDIF;
                temp_id=mod(du_hid, num_nodes);
              IF (num_iter == T)
                  node_id=temp_id;
              ELSE  IF (temp_id >= prev_node_id)
                  node_id = temp_id + 1;
              ELSE
                  node_id=temp_id;
              END IF IF ((node_id.load < MAX_LOAD) && (node_id is up))
                  allocate the data unit du_id to node node_id;
              EXIT;
             END IF
             prev_node_id=node_id;
             num_nodes --;
              num_iter--;
          }
    }
```

300

METHOD FOR FAILURE-RESILIENT DATA PLACEMENT IN A DISTRIBUTED QUERY PROCESSING SYSTEM

CROSS-REFERENCE TO RELATED APPLICATIONS

This application is related to U.S. patent application Ser. No. 12/776,341, titled "Adaptively Routing Transactions To Servers," and filed May 7, 2010 the entire contents of which is hereby incorporated by reference as if fully set forth herein.

FIELD OF THE INVENTION

The present invention relates to storing data in a distributed memory system, and more specifically, to creating a highly available data placement map for balancing the data load across the nodes of a distributed in-memory query processing system.

BACKGROUND

Traditionally, large-scale data sets (e.g., on the scale of multiple terabytes (TB) of data) have been stored on disk-based storage systems, such as RAID (Redundant Array of Independent Disks) systems. An alternative to managing large amounts of data using disk-based storage systems is managing the data via distributed in-memory query processing systems (referred to herein as "distributed query processing systems"). A distributed query processing system includes two or more computing devices, where each device stores a portion of the data assigned to the distributed query processing system, and data management is coordinated among all computing devices in the system.

Given the diminishing cost of storage on individual computing devices, it is becoming more cost-effective to use distributed query processing systems to store and process large amounts of data. Also, distributed query processing systems generally are more scalable than disk-based storage systems in that distributed query processing systems comprise a configurable number of storage nodes. Furthermore, the in-memory processing capability of individual computing devices of a distributed query processing system is generally more powerful and efficient than that of a disk-based computing system by an order of magnitude. As such, by using the processing capability of the individual storage nodes in a distributed query processing system for query processing, such a system allows for increased parallelism in processing queries over data stored at the distributed query processing system.

However, distributed query processing systems are subject to some practical constraints. For example, the computing devices in a distributed query processing system are generally constrained in the amount of memory in the devices, i.e., because of the cost of memory (such as, power consumption of the memory), for architectural reasons, etc. Also, in the case of very large data sets, each node in the system stores only a portion of data for a particular data set, and, at times, processing a query over the data set requires replicating data across nodes in the system.

It is important to carefully allocate data, including data for very large data sets, across the computing devices in a distributed query processing system to facilitate management of the data. To that end, data may be distributed among the nodes of a distributed query processing system by observing a placement algorithm. Existing data placement algorithms can be generally classified into two paradigms: centralized data mapping, and decentralized data mapping.

Centralized data mapping assigns a particular node of a cluster to be the "central" node. Centralized data placement schemes are adopted in many systems such as Hadoop Distributed File System (HDFS), General Parallel File System (GPFS), etc.

The assigned central node stores a data map identifying the location of each portion of data stored among the nodes of the system, and also performs data placement decisions. If the assigned central node attempts to place data at a storage node that is not available to store the data, then the central node picks another destination node for the data, e.g., by incrementing through an array of storage node identifiers until the central node identifies an available storage node. Generally, other nodes in the system report to the central node.

However, centralized data mapping involves allocation of significant storage space in the central node to maintain the data map. Further, all of the data placement traffic and the data lookup service traffic condense in the central node, which causes a bottleneck for the whole system. Also, if the central node crashes, then the central data map is destroyed, which compromises the failure resilience of such a system.

Decentralized data mapping utilizes distributed routing algorithms such as Distributed Hash Table (DHT) to route data placement requests in an overlay network to reach the data destinations. Decentralized data mapping is used by many systems, such as Chord, Dynamo, and Cassandra, etc.

According to this scheme, a request to place particular data in the system is routed from storage node to storage node until the destination storage node is located. The next hop decisions used to route the request are based on a next hop algorithm accessible at each node. Specifically, when a particular node in the system receives the request to place the particular data, the node first checks whether it is the owner of the particular data (i.e., based on a set of ownership rules). If the particular node determines that it is not the owner of the particular data, then the node forwards the data placement request to one or more neighbor nodes, each of which determine whether it is the owner of the particular data by applying the same set of ownership rules as the particular node. Eventually, the data placement request reaches a storage node that determines that it is the owner of the particular data to be placed and this destination storage node stores the particular data.

Accordingly, data lookup is performed through routing the lookup request among the nodes of the system with the next hop being decided in a manner similar to the next hop decision for a request to place data on the system. A request for data is sent from node to node in the system until the owner of the requested data is located.

The number of hops to route the request is logarithmic to the number of nodes in the whole system, which is non-trivial for large-scale systems. Also, given that a query on data in a distributed query processing system may involve data units from a large number of nodes, the cumulative data lookup latency involved in responding to a query based on a decentralized scheme is non-trivial.

Therefore, it would be beneficial to develop an improved placement algorithm, for distributing data amongst the nodes of a distributed query processing system, that is an improvement over the centralized and decentralized systems described above.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 depicts pseudocode for a range modular function.

DETAILED DESCRIPTION

Figure 1:
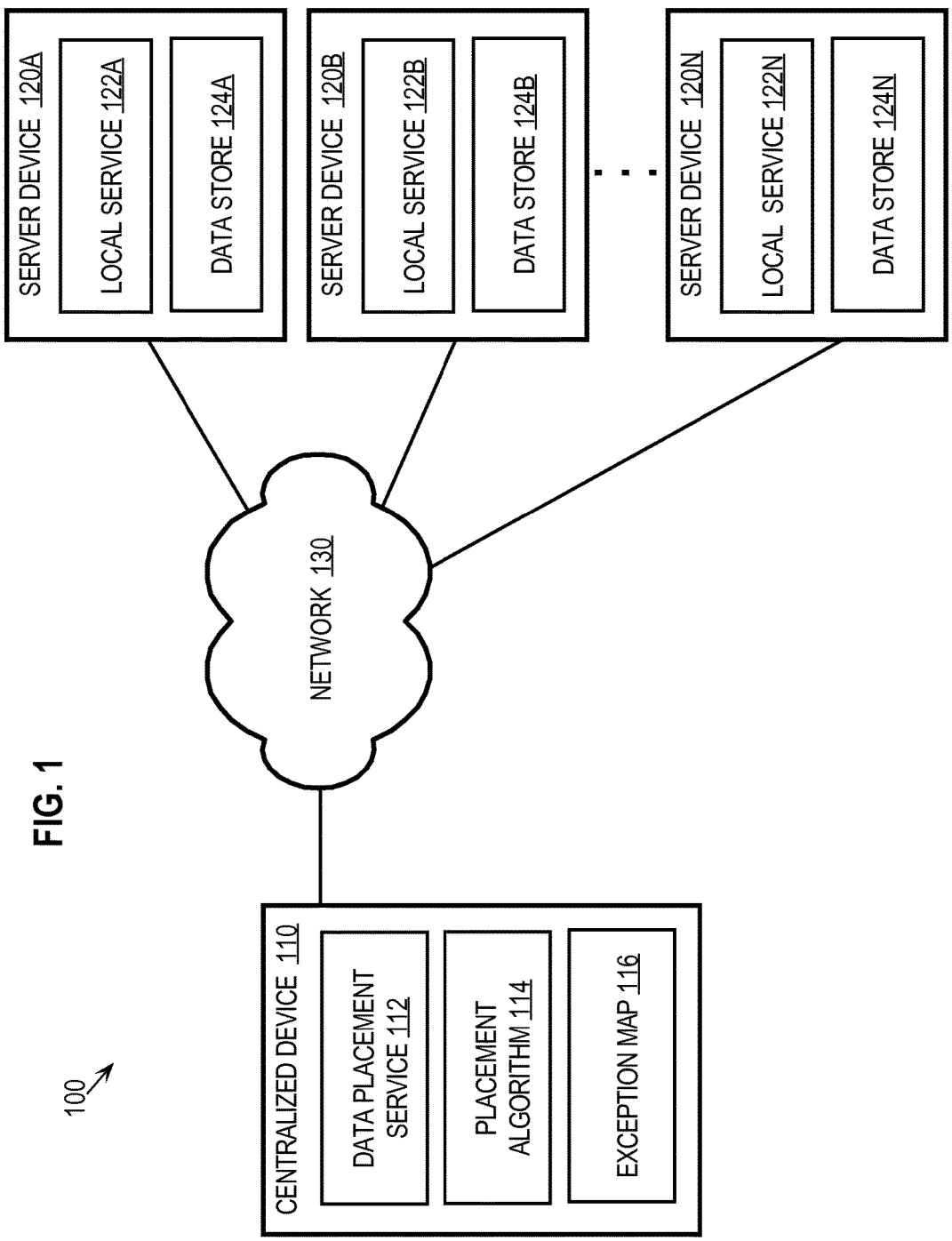
FIG. 1 is a block diagram that depicts an example distributed query processing system that implements a data placement scheme that distributes data load amongst the nodes of the system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is described a data placement scheme for distributed query processing systems that achieves load balance amongst the nodes of the system. Embodiments of the data placement scheme are applicable to systems with a large number of storage nodes, and to systems comprising memory-constrained storage nodes, etc.

To identify a destination node on which to place particular data, a supervisor node in the system performs a placement algorithm over an identifier of the particular data, where the placement algorithm utilizes two or more hash functions. The result of the placement algorithm is used to identify a potential destination node for the data. The two or more hash functions help to ensure that the result of the placement algorithm is practically random, which balances the data load across nodes in the system.

Also, each iteration of the placement algorithm over a particular data identifier returns information identifying a different destination for the particular data. Therefore, if the first iteration of the placement algorithm identifies a storage node that is unavailable to store the particular data, the supervisor node runs the placement algorithm again to determine another potential destination node for the particular data. In fact, the supervisor node runs the placement algorithm until a destination node is identified that is available to store the data, or the supervisor node has run the placement algorithm an established number of times. If no available destination node is identified using the placement algorithm, then the supervisor node identifies an available destination node for the particular data and includes information identifying the data and the selected destination node in an exception map stored at the supervisor node. This exception map will generally be very small because of the load balancing in the system.

Therefore, the data placement scheme described herein requires minimal space on the nodes of the system for data maps, and requires minimal computational resources. Since the majority of data is placed on the system based on the result of the placement algorithm (except those mappings stored in the exceptions map), most of the data on the system may be located without use of a general data map. As such, the data placement scheme described herein requires much less storage space for data used to locate destination nodes than is needed for a fully-materialized data map.

This scheme is also failure resilient with high probability. Most data may be located by any node in the system based on the node performing the placement algorithm for the required data. This allows the system to be flexible, and limits the system's dependency on the supervisor node.

Architecture for a Distributed Query Processing System

FIG. 1 is a block diagram that depicts an example distributed query processing system 100 that implements a data placement scheme that distributes data load amongst the nodes of system 100, according to embodiments. Distributed query processing system 100 includes a supervisor device 110 and a plurality of server devices 120A-N, which are communicatively coupled via a network 130. Example distributed query processing system 100 may include other devices, including client devices, server devices, and display devices, according to embodiments.

Supervisor device 110 may be implemented by any type of computing device that is communicatively connected to network 130 and is configured to run data placement service 112. Example implementations of supervisor device 110 include, without limitation, computing server device, workstations, and any other type of computing device. According to embodiments, supervisor device 110 serves as a supervisor node for distributed query processing system 100 in that supervisor device 110 performs processing to identify particular storage nodes in system 100 on which to place data.

In distributed query processing system 100, supervisor device 110 is configured with a data placement service 112 and a placement algorithm 114. Also, supervisor device 110 is configured with an exception map 116 indicating destination storage nodes, for units of data, the identifiers for which are not derivable based on placement algorithm 114 (as described in further detail below).

Data placement service 112 may be implemented in any number of ways, including as a stand-alone application running on supervisor device 110, as part of a database management system running on supervisor device 110, etc. Data placement service 112 may be implemented by one or more logical modules. Supervisor device 110 may be configured with one or more other mechanisms, processes, information (including databases), and functionalities, depending upon a particular implementation.

Network 130 may be implemented with any type of medium and/or mechanism that facilitates the exchange of information between supervisor device 110 and server devices 120A-N. Furthermore, network 130 may facilitate use of any type of communications protocol, and may be secured or unsecured, depending upon the requirements of a particular embodiment.

Server devices 120A-N may be implemented by any type of computing devices that are capable (a) of communicating with supervisor device 110 over network 130 and (b) of hosting and maintaining a data store (i.e., data stores 124A-N). Server devices 120A-N serve as the storage nodes for distributed query processing system 100, and are referred to herein as storage nodes.

In distributed query processing system 100, server devices 120A-N are configured with local services 122A-N. According to embodiments, the devices of server devices 120A-N do not share memory, disk storage, etc. The numbering system of server devices 120A-N does not limit the storage nodes of system 100 to any particular quantity, but is used herein for ease of explanation.

Data stores 124A-N, in server devices 120A-N, respectively, maintain information placed on system 100. Data stores 124A-N may reside in any type of storage, including volatile and non-volatile storage (e.g., random access memory (RAM), a removable or disk drive, main memory, etc.), and may each be implemented by one or more logical databases. The storage on which data stores 124A-N reside may be external or internal to server devices 120A-N, respectively.

Any of the functionality attributed to one or more of local services 122A-N herein may be performed by another of local services 122A-N, by another entity running on server devices 120A-N, by any entity on supervisor device 110, or on other devices that are communicatively coupled to network 130, according to embodiments. Server devices 120A-N may be configured with other mechanisms, hardware, processes, and functionalities, depending upon a particular implementation.

Data placement service 112 and/or any of local services 122A-N may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from other entities communicatively coupled to network 130. Further, data placement service 112 and/or any of local services 122A-N may send one or more communications, using any of the above protocols or any other communication protocol, over network 130 to one of the other entities communicatively coupled to network 130, according to embodiments.

In an embodiment, each of the processes described in connection with data placement service 112, and/or any of local services 122A-N are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Data Placement Algorithm

It is important to carefully allocate data across the nodes in a distributed query processing system. Careful allocation of data keeps the load balanced among the storage nodes of the system, which impacts, for example, query execution performance, ease of management, and the ability to efficiently retrieve and update stored information. Many times, a distributed query processing system such as system 100 is used to store large data sets that include on the order of multiple terabytes of data. In the context of such a large data set, proper load balancing of the data across the nodes in the system (i.e., server devices 120A-N) is important because an overloaded node may throttle the performance operations involving data on multiple nodes in the system.

Accordingly, embodiments comprise a data placement algorithm that provides information indicating where to store particular data units. This data placement algorithm creates small spatial overheads, imposes light computation overhead, achieves load balance amongst the storage nodes of the system, and provides failure resilience for the data stored on the system. The algorithm is a hybrid data placement algorithm that bears advantages of both a totally centralized design and a totally decentralized design.

According to embodiments, a supervisor node, i.e., supervisor device 110, determines where to place particular units of data amongst the storage nodes of the system. A unit of data is a logical portion of data that is discretely stored independent of other units of data. An example of a unit of data is a particular data block, data blocks pertaining to a particular range of data block identifiers, data blocks pertaining to a particular extent in a primary data store, or any other logical unit of data.

Each data unit in a data set is identified by an identifier (referred to herein as a "data unit id"). The data unit id of a particular data unit uniquely identifies the data unit amongst the data set, and amongst any other data stored in system 100. To illustrate in the case of a relational data source of the unit of data, the data unit id for a particular unit of data may be derived from an extended block number for the data (filename number plus block number).

Figure 2:
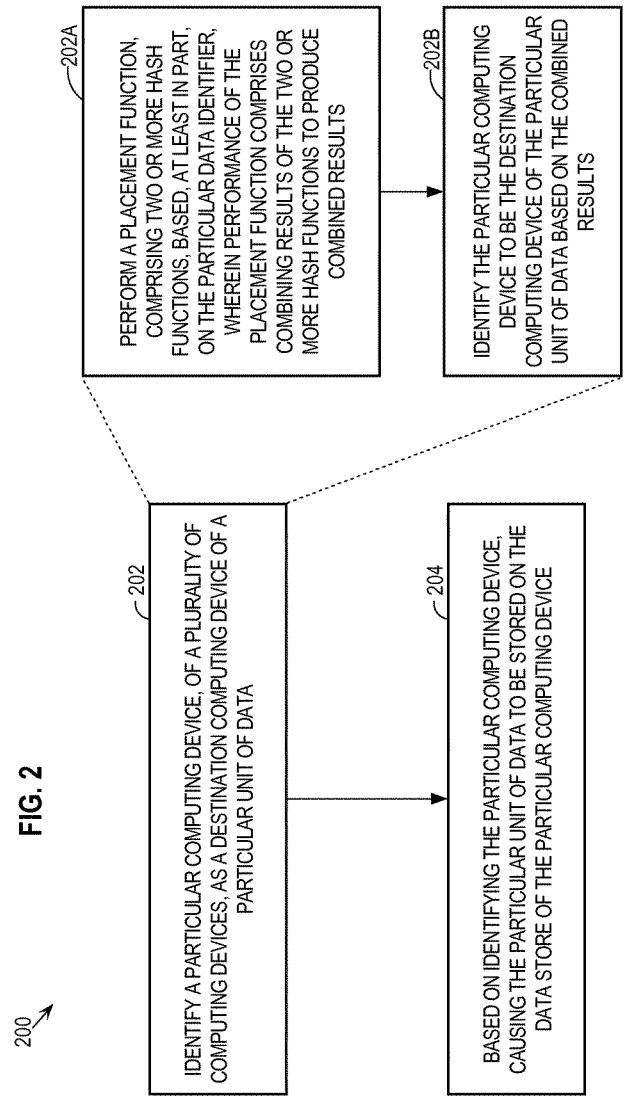
FIG. 2 depicts a flowchart for identifying a particular node of a distributed query processing system on which to store a particular unit of data.

FIG. 2 depicts a flowchart 200 for identifying a destination storage node of a distributed query processing system on which to store a particular unit of data. At step 202 of flowchart 200, a particular computing device, of a plurality of computing devices, is identified as a destination computing device of a particular unit of data. For example, data placement service 112 of supervisor device 110 receives information indicating a request to store a particular unit of data. In response to receiving the request, data placement service 112 identifies a particular node from server devices 120A-N to be the destination computing device of the particular unit of data. As another example, data placement service 112 automatically identifies the need to store the particular unit of data, e.g., based on a received request to store a data set that includes the particular unit of data.

According to an embodiment, data placement service 112 receives, in a message, the data unit. According to another embodiment, data placement service 112 retrieves the data unit from a primary data store. In this embodiment, the primary data store is a database, accessible to data placement service 112, which stores data that is also stored at system 100. For example, the primary data store is a relational database for which the data resides in disk, buffer cache, or in memory of supervisor device 110 (not shown in FIG. 1) or any other device communicatively connected to supervisor device 110. To illustrate, supervisor device 110 runs a relational database server, such as Oracle database server, that provides access to and manages the primary data store relational database.

As indicated in flowchart 200, step 202 includes sub-steps 202A and 202B. At step 202A, a placement function is performed based, at least in part, on the particular data identifier, where the placement function comprises two or more hash functions, and where performance of the placement function comprises combining results of the two or more hash functions to produce combined results. For example, data placement service 112 implements placement algorithm 114, which comprises at least two hash functions as described in further detail below.

For example, placement algorithm 114 is the following deterministic double hashing function:

$$(h1(du\_id)+\text{iter}*h2(du\_id)) \bmod N \qquad (1)$$

In this example, placement algorithm 114 receives two inputs: "du_id", which represents the data unit id of a given data unit; and "iter", which denotes the number of times placement algorithm 114 has been run in order to determine the destination node of the given data unit. In placement algorithm 114, N denotes the number of storage nodes (i.e., the number of server devices 120A-N) in system 100.

This example placement algorithm 114 comprises two deterministic hashing functions: "h1(du_id)" and "h2(du_id)". According to embodiments, hash functions h1 and h2 produce different results given a particular data unit id. These hash functions may be configured by an administrator to produce the most random results possible over the range of possible data unit ids and given the total number of storage nodes. Random results from placement algorithm 114 ensures that the load will be properly balanced among the nodes of system 100. If the hash functions do not produce sufficiently random results, the data stores (124) of particular storage nodes of system 100 will likely fill up more quickly than the data stores (124) of other storage nodes, which creates a load imbalance in the system.

Returning to the explanation of flowchart 200, data placement service 112 performs placement algorithm 114 with the data unit id for the particular data unit. The results of the two hash functions are combined, and the combined result is used to identify a particular storage node in system 100 on which to store the particular data unit (as described in further detail below).

Data placement service 112 performs, for a first iteration (meaning "iter" equals zero), placement algorithm 114 based on the data unit id of the particular data unit. As a non-limiting illustration, the number of storage nodes in the system is 12; "h1"=du_id mod 15; and "h2"=du_id mod 22. Also, the data unit id of the particular data unit is 89. As such, data placement service 112 performs the following calculations based on the given placement algorithm 114: (h1(89)+0*h2(89)) mod 12. The result of h1(89) is 14. The result of h2 is negated in this particular iteration of placement algorithm 114 because it is the first iteration, and the combination (or, in this case, addition) of the results of the two hash functions is (14+0) mod 12. Of course, 14 mod 12=2. Therefore, the combined result of data placement service 112 running placement algorithm 114 based on the data unit's identifier is 2.

At step 202B, the particular computing device is identified to be the destination computing device of the particular unit of data based on the combined results. For example, each storage node in system 100 is identified by a node identifier, which uniquely identifies the associated storage node among the storage nodes of system 100. Based on the previous example, there are 12 storage nodes in system 100, and each storage node is assigned an integer value from 0-11 such that server device 120A corresponds to node identifier 0, server device 120B corresponds to node identifier 1, etc. Data placement service 112 determines that the destination storage node for the particular unit of data is the node among server devices 120A-N with a node identifier of 2, which is server device 120C (not pictured in FIG. 1).

At step 204, the particular unit of data is caused to be stored on the data store of the particular computing device based on identifying the particular computing device. For example, data placement service 112 determines whether server device 120C is available to store the particular unit of data. A particular node is not available to store data when the node has failed, the node is under recovery, the data store 124 of the node has reached its maximum threshold for data load, or for any other reason that would cause the particular node to be unavailable to store data.

In response to determining that server device 120C is available to store the particular unit of data, data placement service 112 causes server device 120C to store the particular unit of data in data store 124C (on server device 120C). To illustrate, data placement service 112 sends the particular unit of data (or information identifying the particular unit of data) to server device 120C. In response to receiving information for the particular unit of data, local service 122C causes the data to be stored at data store 124C.

Furthermore, each storage node in system 100 maintains its own materialized data placement map that tracks what data units are placed on the associated storage node. As data units are allocated to or deleted from a particular storage node, the data placement map for the node is timely updated to reflect these changes. As such, when the particular unit of data is stored in data store 124C, local service 122C also includes information identifying the particular unit of data (such as the data node id "89") to be included in the data placement map, maintained by server device 120C, that includes information about all of the data units that are stored at server device 120C.

Failure Resilience in Data Placement

In order to place a particular unit of data on a destination storage node, data placement service 112 runs placement algorithm 114 until one of the nodes mapped to a resulting node identifier is available, or until data placement service 112 has run placement algorithm 114 an established number of times. For example, an administrator establishes a maximum number of times that data placement service 112 will run placement algorithm 114 to identify the destination node for a particular unit of data. Because data placement service 112 will only run placement algorithm 114 the established number of times, the number of logical hops that it takes to identify the destination node for a particular unit of data is bound to a constant.

Thus, returning to the previous example, if data placement service 112 determines that server device 120C is not available, then data placement service 112 determines whether placement algorithm 114 has been run the established number of times (e.g., a maximum of 2 times) to identify a destination node for the particular unit of data. In this case, placement algorithm 114 has only been run once, which is less than the established maximum number of times.

Therefore, data placement service 112 runs placement algorithm 114 a second time. Because placement algorithm 114 uses the iteration number ("iter") as part of its calculation, the node identifier that is the result of placement algorithm 114 is different at each iteration of the algorithm. For example, data placement service 112 performs, for a second iteration (meaning iter equals one), placement algorithm 114 based on the data unit id of the particular data unit as follows: (h1(89)+1*h2(89)) mod 12. As before, the result of h1(89) is 14. Also, the result of h2(89) is 1. The combination of the results of the two hash functions is (14+1) mod 12, which equals 3. As such, the result of the second iteration of placement algorithm 114 is the node among server devices 120A-N with a node identifier of 3, which is server device 120D (not depicted in FIG. 1).

Returning to the previous example, data placement service 112 determines whether server device 120D is available to store the particular unit of data. If server device 120D is available, then data placement service 112 causes the particular unit of data to be stored at server device 120D in a manner similar to that which is described above in connection with server device 120C.

If server device 120D is not available, then data placement service 112 again determines whether placement algorithm 114 has been run the established maximum number of times to identify a destination node for the particular unit of data being placed in system 100. At this point, placement algorithm 114 has been run twice, which is equal to the established maximum number of times, which is two.

Since placement algorithm 114 has been run the established number of times, data placement service 112 identifies the destination node for the particular unit of data as a data unit exception, which does not utilize placement algorithm 114. That is, after running placement algorithm 114 the established number of times and each node identified by placement algorithm 114 is not available, data placement service 112 determines that the given data unit is to be placed on a storage node whose id is not generated by placement algorithm 114. That is, the given data unit is identified to be a data unit exception. For example, data placement service 112 identifies a destination storage node for the particular unit of data based, at least in part, on information that indicates which storage nodes are available to store the particular unit of data. Placement service 112 adds, to exception map 116, an entry that records information identifying the given data unit and the identified destination storage node, e.g., in the format (data_unit_id, owner node id).

According to embodiments, supervisor device 110 has access to information indicating which of server devices 120A-N are available (including how much free space is in the devices' respective data stores 124A-N). Data placement service 112 selects one of the available storage nodes in system 100 on which to store the particular unit of data, e.g., via a round robin scheme for picking an available storage node, via a determination of which available storage node has the most amount of free space in its data store 124, etc.

Once data placement service 112 selects a destination storage node for the particular unit of data, e.g., server device 120A, data placement service 112 causes the selected storage node to store the particular unit of data. For example, data placement service 112 sends the particular unit of data to server device 120A. Local service 122A causes the particular unit of data to be stored at data store 124A and records storage of the particular unit of data in the data placement map, maintained by server device 120A.

Thus, system 100 is failure resistant with respect to data placement in that an entity that is attempting to identify a destination node for a particular unit of data runs placement algorithm 114 a configurable number of times based on the particular unit of data. Configuring placement algorithm 114 to be run two or more times to identify a destination node for a particular unit of data increases the potential for algorithm-based placement of data units despite the potential of failed nodes in the system. Also, the limited number of times that placement algorithm 114 is run to identify a destination node for a particular unit of data maximizes the possibility that a data unit will be placed using placement algorithm 114 without requiring placement algorithm 114 to be run an overly large number of times, i.e., in the case of widespread storage node unavailability. Furthermore, in the case of placement algorithm 114 returning all unavailable nodes as potential destinations for a particular unit of data, data placement service 112 uses an alternative method to pick an available node as the destination node and a mapping of the unit of data to the selected destination node is stored in the exception map as described above.

Exception Map

Also, because the destination storage node for the particular unit of data was not indicated in a result of placement algorithm 114 based on the data unit id of the data, data placement service 112 also stores information about the selected destination node in exception map 116. For example, data placement service 112 causes exception map 116 to store a mapping between data unit id "89" and the storage node identifier of server device 120A, i.e., "0".

Exception map 116 may be implemented by any data structure or data storage that can store mappings between information identifying units of data (at least data unit ids) and information identifying the respective destination storage nodes for the units of data. For example, exception map 116 may be implemented in a hash table, an XML database, a b-tree or other structure in a relational database, etc.

Due to the algorithmic nature of the placement of most units of data on system 100, only information about destination storage nodes that were not identified in results of placement algorithm 114 must be materialized, i.e., in exception map 116. All other placement mappings can be derived from placement algorithm 114 and need not be materialized. Furthermore, use of placement algorithm 114 in placing data units on the storage nodes of system 100 keeps the load balanced between the storage nodes. This allows exception map 116 to stay very small in most circumstances, unless system 100 becomes overloaded.

According to embodiments, data placement service 112 produces email notifications, e.g., to notify human administrators via email, when mappings are stored in exception map 116. Such information may be useful to an administrator to gauge the health of system 100, to determine whether the system is overloaded, to determine that one or more changes are needed in placement algorithm 114 and/or the established maximum number of times placement algorithm 114 can be run to identify a destination storage node for a particular unit of data, etc.

To illustrate, data placement service 112 maintains a list of email addresses to which data placement service 112 sends an email with information indicating that one or more data units have been mapped to destination storage nodes in exception map 116. For example, data placement service 112 sends an email to the listed email addresses when the number of mappings stored in exception map 116 exceeds a particular threshold number of mappings. This threshold number of mappings is configurable by an administrator so as to cause generation of email notifications when the size of exceptions map 116 grows past a certain point.

According to embodiments, a notification is also produced if no space is available to store a particular unit of data on any of the storage nodes in system 100 (aka "storage failure"). According to embodiments, if a storage failure is detected, data placement service 112 places information identifying the particular unit of information in a queue of information that is yet to be stored on the system. In response to detecting that information is deleted from system 100, freeing up space on one or more of data stores 124A-N, data placement service 112 attempts to place one or more units of data from the queue onto system 100 as described above.

Such a use of placement algorithm 114 allows for the destination storage nodes of a majority of data units stored at system 100 to be known to any node in the system that implements placement algorithm 114. Since maintenance of placement algorithm 114 requires very little memory, placement algorithm 114 can be utilized by each node in system 100 independent from any other node in the system without significant memory resources dedicated to the algorithm. Therefore, since the exception map 116 is generally very small as well, embodiments are likely to use a minimum of storage space on any node that is required to place or retrieve data units in system 100.

Data Retrieval

According to an embodiment, in order to retrieve a particular data unit from system 100, data placement service 112 first determines whether a mapping for the particular data unit is included in exception map 116. If such a mapping exists, then data placement service 112 identifies the destination storage node of the particular data unit from the mapping and requests the data unit from the identified node.

If a mapping for the particular data unit is not included in exception map 116, then data placement service 112 runs a first iteration of placement algorithm 114 to identify a first potential destination node for the data unit, e.g., server device 120C for a data unit with the data unit id "89". Data placement service 112 requests the particular data unit from the identified potential destination node, e.g., from local service 122C on the identified server device 120C. Local service 122C runs a query on the data placement map maintained at server device 120C to determine if data store 124C includes the indicated data unit. If it does, local service 122C returns the requested data unit to data placement service 112. If data store 124C does not store the indicated data unit, local service 122C sends a failure notification to data placement service 112.

In the case of a failure of the first potential destination node finding the indicated data unit, data placement service 112 performs iterations of placement algorithm 114 (as described in detail above) until the data unit is found on a storage node identified by the results of placement algorithm 114 (as described above), or the established maximum number of iterations is performed. According to embodiments, the iterations of placement algorithm 114 may be computed (and the resulting storage nodes queried for the requested data unit) in parallel.

If data placement service 112 runs placement algorithm 114 the established number of times without successfully identifying the destination node of the indicated unit of data, data placement service 112 determines that the data unit is not stored on system 100. According to an embodiment, in response to determining that the data unit is not stored on system 100, data placement service 112 reports, to the requesting entity, that the data is not found on system 100. According to another embodiment, in response to determining that the data unit is not stored on system 100, data placement service 112 retrieves the requested data from a primary data store accessible to supervisor device 110.

Storage Node-Initiated Data Retrieval

Especially as described above in connection with initial data unit placement, supervisor device 110 has some functionality that is similar to a central node in a centralized data distribution system. However, other aspects of the system—including retrieval of data from server devices 120A-N—incorporate features that are more similar to a decentralized system. Specifically, each node in system 100 is configured with placement algorithm 114, and is configured to use placement algorithm 114 to identify the destination node for data units that the storage node requires.

Server devices 120A-N may utilize placement algorithm 114, as described for supervisor device 110 above, for any situation in which a storage node needs a unit of data not stored on the node, such as while the node is in recovery. Specifically, while in recovery, a server device may need to determine the owner of a particular unit of data that has been lost to the server device and, if the server device is the owner of the data, then the server device solicits data placement service 112 to request the lost data unit from any available primary data store.

Another situation that may lead to a storage node requiring a unit of data not stored at the storage node is when the storage node is tasked with performing part or all of a query. For example, supervisor device 110 receives a request to perform a particular query on the data stored at system 100. A query processing unit on supervisor device 110 (not shown in FIG. 1) tasks server device 120A to perform at least a portion of the query. In performing the query, local service 122A determines that a particular unit of data (e.g., with data unit id "50") is needed to generate the required query results.

According to embodiments, local service 122A determines that the required data unit (referred to as data unit "50") is not stored at data store 124A. In response to this determination, local service 122A follows the data retrieval process outlined above in connection with supervisor device 110. Specifically, local service 122A first requests information from data placement service 112 about any mapping included in exception map 116 that maps data unit "50" to a particular destination node.

If exception map 116 does not include information about the destination node for data unit "50", then local service 122A runs a first iteration of placement algorithm 114 for data unit "50". An example is run for data unit "50" using the same non-limiting information about placement algorithm 114 used in examples above, specifically: placement algorithm 114=(h1(du_id)+iter*h2(du_id)) mod N; the number of storage nodes in the system is 12; "h1"=du_id mod 15; and "h2"=du_id mod 22.

Data placement service 112 performs the following calculations for the first iteration of placement algorithm 114: (h1(50)+0*h2(50)) mod 12. The result of h1(89) is 5. Since it is the first iteration and "iter"=0, the result of h2 is negated in this iteration of placement algorithm 114. The combination of the results of the two hash functions is (5+0) mod 12, which equals 5. Therefore, the combined result of data placement service 112 running placement algorithm 114 based on the identifier of data unit "50" is 5.

Based on this result, data placement service 112 identifies the storage node that corresponds to the node identifier "5" (or server device 120F, not depicted in FIG. 1) to be the first potential destination node for data unit "50". Local service 122A requests information from local service 122F, associated with the first potential destination node server device 120F, as to whether data unit "50" is stored at data store 124F.

In this manner, local service 122A performs iterations of placement algorithm 114 until the destination node of data unit "50" is found, or the established maximum number of iterations is performed. If, after checking exception map 116 and performing the established number of iterations of placement algorithm 114, the destination node of data unit "50" is not found, then local service 122A: returns a query failure message to supervisor device 110; solicits data placement service 112 to request data unit "50" from any available primary data store; etc.

According to another embodiment, when local service 122A determines that the data unit "50" is not stored at data store 124A, and before local service 122A requests information about mappings in exception map 116, local service 122A first runs placement algorithm 114 for one or more iterations. If these one or more iterations do not result in information identifying the destination node of data unit "50", local service 122A then requests, from data placement service 112, any mappings in exception map 116 that map a destination storage node to data unit "50".

If information indicating any destination node for data unit "50" is not stored in exception map 116 and local service 122A has not yet performed the established maximum number of iterations of placement algorithm 114 to identify a destination node for data unit "50", then local service 122A performs iterations of placement algorithm 114 until the destination node of data unit "50" is found, or the established maximum number of iterations is performed. As with the embodiment above, if, after checking exception map 116 and performing the established number of iterations of placement algorithm 114, the destination node of data unit "50" is not found, then local service 122A performs one or more of the following actions: returns a query failure message to supervisor device 110; solicits data placement service 112 to request data unit "50" from any available primary data store; etc.

Since there is a high likelihood of identifying the destination node of a particular unit of data using placement algorithm 114, the majority of the lookup computation overheads is distributed among many nodes, instead of overwhelming supervisor device 110, which will cause system 100 to have significantly less system latency and higher throughput over more centralized systems requiring the central node to store information for (and also perform) at least the majority of data retrievals.

Furthermore, when compared with the decentralized routing algorithms, using placement algorithm 114 to identify destination nodes for data units significantly reduces the routing hops needed in each data lookup operation. Decentralized data placement generally achieves a routing efficiency that is logarithmic to the number of storage nodes in the system, which is nontrivial overhead. Using placement algorithm 114 to place and retrieve data units in system 100, the data lookup operation is bound to a constant (i.e., the established maximum number of iterations of placement algorithm 114) and thus it is a significant improvement when compared with the logarithmic lookup efficiency in existing decentralized routing algorithms.

Node Recovery

In a memory-constrained system, i.e., where the storage nodes in the system have a limited amount of in-memory data storage capacity, large-scale replication of data is infeasible because such replication would over-tax the storage and processing capability of the system. Nevertheless, it is important that a distributed query processing system also be failure-resistant, which includes node recovery.

Embodiments allow for transparent node recovery. When a node is declared failed and it undergoes recovery, the data that it owned may need to be reloaded into system 100. Data placement service 112 identifies the data units that need to be reloaded into system 100 by identifying the destination storage node (according to embodiments described above) of every data unit that has been stored onto system 100. For example, supervisor device 110 maintains a record of the data unit id for each data unit that is stored on system 100 and data placement service 112 bases the search for destinations of all data units on system 100 on that data unit id record.

Data placement service 112 identifies all of the data unit identifiers that map to the failed storage node in exception map 116. Based on these mappings, data placement service 112 determines that the data units corresponding to the data unit ids that are mapped to the failed storage node in exception map 116 were stored at the failed storage node prior to failure.

Also, data placement service 112 determines whether any data units were stored on the failed storage node using placement algorithm 114. For example, data placement service 112 performs placement algorithm 114 based on the data unit identifiers of all non-exception data units, i.e., which are (a) stored on system 100 and (b) not mapped to a destination node in exception map 116. If one of the storage nodes identified by placement algorithm 114 (with an identifier of a particular non-exception data unit as input) stores the particular non-exception data unit, then data placement service 112 determines that the particular non-exception data unit was not stored on the failed storage node prior to failure.

However, if data placement service 112 runs placement algorithm 114 the established maximum number of iterations for a particular non-exception data unit and (a) none of the storage nodes identified by placement algorithm 114 store the particular non-exception data unit, and (b) one of the potential destination storage nodes identified by placement algorithm 114 is the failed storage node, then data placement service 112 determines that the sought data unit was stored at the failed storage node prior to failure. Data placement service 112 requests those data units that were determined to have been stored on the failed storage node prior to failure from the primary data store.

Furthermore, a backup of the data on supervisor device 110 (i.e., exception map 116) may be maintained on a device other than supervisor device 110 in order to create failure redundancy for supervisor device 110. Data stored at supervisor device 110 may be continuously updated to the backup, or may be updated at intervals (the timing for which is configurable by an administrator). In general, the backup storage requirements for supervisor device 110 will be small because exception map 116 will be small unless system 100 is overloaded. Also, since placement algorithm 114 is located on multiple nodes in the system, data for placement algorithm 114 has built-in redundancy. Any changes to placement algorithm 114 at supervisor device 110 are propagated to one or more of server devices 120A-N in the natural course of operation of system 100.

Variations of the Placement Algorithm

Embodiments include various implementations of placement algorithm 114. For example, placement algorithm may include more than two hashing functions, which may serve to: (a) increase the randomness (and therefore load balance) of the data placement; (b) configure placement algorithm 114 to be likely to place more data units at particular storage nodes than at other storage nodes (e.g., if the particular storage nodes have a greater capacity for storing data units than the other storage nodes); etc.

Furthermore, embodiments include implementations of the hashing functions of placement algorithm 114 that take into account architecture on which system 100 is implemented and various design principles. For example, a striping data placement algorithm is used, in which a flat system 100 architecture is assumed. According to this striping implementation of data placement algorithm 114, the hashing functions produce random results (such as multiplication hashing functions or Cyclic Redundancy Check (CRC) hashing functions, etc.). A striping data placement algorithm aims to evenly spread stored data units among server devices 120A-N.

Embodiments further include a domain-aware decentralized implementation of data placement algorithm 114. In this embodiment, server devices 120A-N are arranged into node domains, where each storage node is mapped to one of multiple node domains. A domain-aware placement algorithm first maps a unit of data to a domain identifier in system 100. The algorithm then maps the data unit id to a particular storage node assigned to the identified domain.

As a non-limiting illustration, server devices 120A-N are arranged into five domains, with domain identifiers 0-4. Data placement service 112 maps a data unit id "89" of a data unit to be stored in system 100 to a particular domain using at least a first hashing function. According to a non-limiting example, an example implementation of the first hashing function returns a domain identifier of "1". Data placement service 112 then maps the data unit id ("89") to a particular storage node that is in the domain with the identifier of "1" using at least a second hashing function (with a range that is the number of nodes in the identified domain) over the data unit id. If the storage node identified by the resulting node identifier is available, the identified storage node becomes the destination node of the data unit.

However, if that storage node is unavailable, data placement service 112 performs a second mapping of the data unit id ("89") to a particular storage node that is in the domain with the identifier of "1" using at least the second hashing function. More specifically, according to an embodiment, further attempts by data placement service 112 to place the data unit with the identifier "89" are performed without re-calculating the domain in which the data unit is to be placed. In this second iteration, the second hashing function is used with a modified range, e.g., one less or one greater than the number of nodes in the identified domain. If the resulting node is available, data placement service 112 causes that node to store the data unit. Assuming an established maximum number of iterations of two, if the resulting node is not available, the data unit is placed by data placement service 112 as an exception as described above.

FIG. 3 depicts pseudocode for a range modular function 300. Function 300 is used to map from a data unit id into a storage node domain (identified by domain_id). The destination storage node is determined through a range modular operation on a hash on the data unit id (du_hid). The range is the size of the domain. The resulting node is a candidate data unit destination among the nodes of the storage node domain associated with the domain_id. If the resulting node (denoted as node_id) is available to store the subject data unit, then the data unit is allocated to this node and the allocation process is done.

Otherwise, a second-time range modular operation is run on the data unit id, based on the size of the domain reduced by 1. This second iteration of the range modular operation produces the second candidate data unit destination (denoted as node_id2) within the previously identified storage node domain. If node_id2 is available, then the data unit is allocated to node_id2.

Otherwise, after T iterations (i.e., the established maximum number of iterations) of the range modular operation to identify data units within the previously identified domain, data placement service 112 identifies a destination storage node on system 100 as a data unit exception and stores mapping data that maps the data unit id to the destination storage node in exception map 116, as described above. According to an embodiment, each iteration of the range modular function operates on the same storage node domain. According to an embodiment, each iteration of the range modular function independently selects a storage node domain in which to place the subject data unit.

Furthermore, in the example function 300, the modular range is reduced by 1 for each iteration. According to further embodiments, to equalize the probability for the first half modular range and the second half modular range, node_id is increased by one for the case that temp_id is equal to or larger than prev_node_id.

According to another embodiment, a partition-aware implementation of data placement algorithm 114 takes into account partitions in a source of the data units, such as the primary data store described above. When at least some of the data in the primary data store is partitioned, partition pruning can improve the efficiency of generating responses to queries on this partitioned data. Partition pruning may be implemented when the syntax of a query specifies particular partitions to be accessed, etc.

Query processing performed by distributed query processing system 100 can be improved by mapping the data units from the same partition in the primary data store to the same domain of storage nodes in system 100 which significantly reduces the data movement overheads in processing query functions, such as join. Thus, information about the partitioning scheme from the primary data store may be preserved in system 100, which allows system 100 to implement partition-dependent and efficiency-increasing techniques for queries on the partitioned data, such as partition pruning Information about the partition in which a particular unit of data resides in the primary data store is included in a request for system 100 to store the particular unit of data.

Server devices 120A-N may be divided into domains, as described above, and data from a particular partition may be stored on storage nodes that pertain to a particular domain. In this example, data placement service 112 identifies a particular domain of storage nodes on which to store a particular unit of data based on the partition of the data in the primary data store. According to embodiments, data placement service 112 identifies a particular node within the domain on which to place the particular unit of data using placement algorithm 114. Because data units from the same partition in the primary data store are stored in the same domain in system 100, partition-aware data placement takes advantage of higher communication efficiency within the same domain in system, compared with potentially costly communication overheads across different storage node domains.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
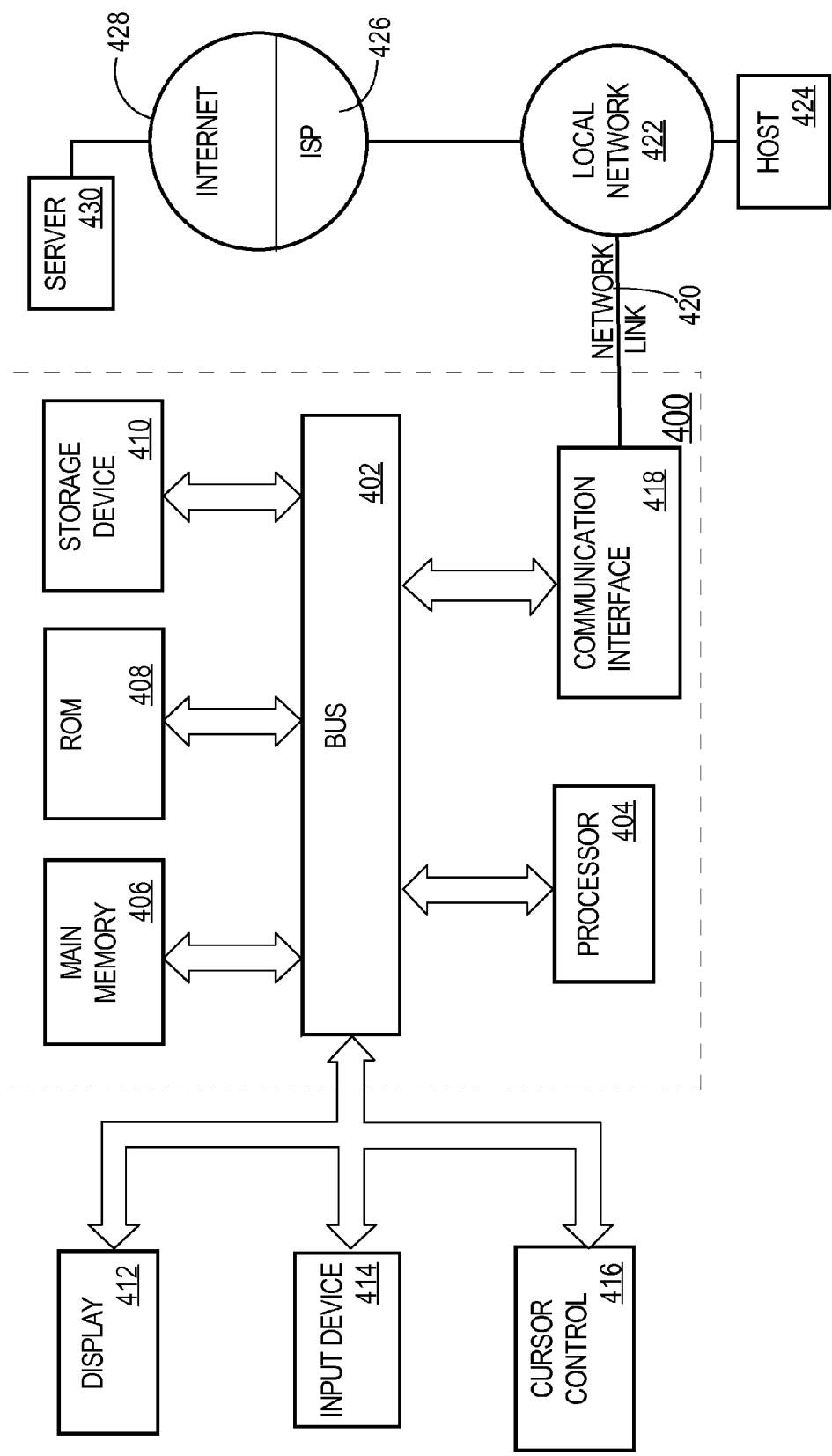
FIG. 4 is a block diagram of a computer system on which embodiments may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing Overview

The techniques described herein are implemented using one or more processing solutions, examples of which include distributed systems, clustered computing systems, and cloud computing systems. In an embodiment, system 100 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. Further, any part (or the whole of) the functionality attributed to system 100 is controllable via an interface that is exposed at a cloud computing system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computerized distributed query processing system comprising:
a plurality of computing devices, each computing device being configured with a data store; and
a supervisor computing device communicatively connected to the plurality of computing devices;
wherein the supervisor computing device is configured to:
identify a particular computing device of the plurality of computing devices as a destination computing device of a particular unit of data;
wherein the particular unit of data is uniquely identified, among all units of data stored on the computerized distributed query processing system, by a particular data identifier;
to identify said particular computing device, said supervisor computing device is configured to:
perform a placement function, comprising two or more hash functions, based, at least in part, on the particular data identifier,
wherein said supervisor computing device being configured to perform the placement function comprises said supervisor computing device being configured to:
combine results of the two or more hash functions to produce combined results, and
identify the particular computing device to be the destination computing device of the particular unit of data based on the combined results; and
to cause the particular unit of data to be stored on the data store of the particular computing device as the destination computing device of the particular unit of data.

2. The computerized distributed query processing system of claim 1, wherein the supervisor computing device is further configured to:
prior to performance of the placement function, determine whether the placement function has been run, to identify the destination computing device for the particular unit of data, less than a particular number of times; and
in response to a determination that the placement function has been run, to identify the destination computing device for the particular unit of data, less than the particular number of times, perform the placement function on the particular data identifier.

3. The computerized distributed query processing system of claim 1, wherein the supervisor computing device is further configured to:
identify a certain computing device of the plurality of computing devices as a destination computing device of a second unit of data;
wherein the second unit of data is uniquely identified, among all units of data stored on the computerized distributed query processing system, by a second data identifier;
to identify said certain computing device, said supervisor computing device is configured to:
determine whether the placement function has been run, to identify the destination computing device for the second unit of data, less than or equal to a particular number of times; and
in response to a determination that the placement function has been run, to identify the destination computing device for the second unit of data, the particular number of times:
identify the certain computing device to be the destination computing device of the second unit of data based, at least in part, on information that indicates that the certain computing device is available to store the second unit of data, and
include information mapping the second unit of data to the certain computing device in an exception map stored at the supervisor computing device; and
based on identification of the certain computing device, cause the second unit of data to be stored on the certain computing device.

4. The computerized distributed query processing system of claim 1, wherein the supervisor computing device is further configured to:
identify a certain computing device of the plurality of computing devices as a destination computing device of a second unit of data;
wherein the second unit of data is uniquely identified, among all units of data stored on the computerized distributed query processing system, by a second data identifier;
to identify said certain computing device, said supervisor computing device is configured to:
perform a first performance of the placement function that is based, at least in part, on the second data identifier,
wherein the first performance of the placement function comprises combining results of the two or more hash functions to produce second combined results,
identify a first unavailable computing device based on the second combined results,
determine that the first unavailable computing device is not available to store the second unit of data,
in response to a determination that the first unavailable computing device is not available to store the second unit of data, perform a second performance of the placement function that is based, at least in part, on the second data identifier,
wherein the second performance of the placement function comprises combining results of the two or more hash functions to produce third combined results,
wherein the third combined results are different than the second combined results,
identify the certain computing device based on the third combined results, and
determine that the certain computing device is available to store the second unit of data; and
in response to a determination that the certain computing device is available to store the second unit of data, cause the second unit of data to be stored on the certain computing device.

5. The computerized distributed query processing system of claim 1, wherein the supervisor computing device is further configured to retrieve a certain unit of data from a certain computing device of the plurality of computing devices by being configured to:

retrieve information mapping an identifier of the certain unit of data to the certain computing device in an exception map stored at the supervisor computing device; and retrieve the certain unit of data from the certain computing device based on the retrieved information mapping the identifier of the certain unit of data to the certain computing device.

6. The computerized distributed query processing system of claim 1, wherein the supervisor computing device is further configured to retrieve a certain unit of data from a certain computing device of the plurality of computing devices by being configured to:

determine that an exception map stored at the supervisor computing device does not include information mapping a certain data identifier that identifies the certain unit of data to any of the plurality of computing devices;

in response to a determination that the exception map does not include information mapping the certain data identifier to any of the plurality of computing devices:
 perform a second performance of the placement function based, at least in part, on the certain data identifier,
 wherein the second performance of the placement function comprises combining results of the two or more hash functions to produce second combined results, and
 identify the certain computing device to be the destination computing device of the certain unit of data based on the second combined results; and based on an identification of the certain computing device to be the destination computing device of the certain unit of data, retrieving the certain unit of data from the certain computing device.

7. The computerized distributed query processing system of claim 1, wherein one or more of the plurality of computing devices are independently configured to retrieve a certain unit of data from a certain computing device of the plurality of computing devices by being configured to:

perform a second performance of the placement function based, at least in part, on a certain data identifier that identifies the certain unit of data;

wherein the second performance of the placement function comprises combining results of the two or more hash functions to produce second combined results;

identify the certain computing device to be the destination computing device of the certain unit of data based on the second combined results; and based on an identification of the certain computing device to be the destination computing device of the certain unit of data, retrieve the certain unit of data from the certain computing device.

8. A computer-implemented method comprising:

identifying a particular computing device, of a plurality of computing devices, as a destination computing device of a particular unit of data;

wherein a distributed query processing system comprises the plurality of computing devices;

wherein each of the plurality of computing devices is configured with a data store;

wherein the particular unit of data is uniquely identified, among all units of data stored on the distributed query processing system, by a particular data identifier;

wherein identifying the particular computing device comprises:

performing a placement function, comprising two or more hash functions, based, at least in part, on the particular data identifier, wherein performance of the placement function comprises combining results of the two or more hash functions to produce combined results, and identifying the particular computing device to be the destination computing device of the particular unit of data based on the combined results; and based on identifying the particular computing device, causing the particular unit of data to be stored on the data store of the particular computing device.

9. The method of claim 8, further comprising:

prior to performing the placement function, determining whether the placement function has been run, to identify the destination computing device for the particular unit of data, less than a particular number of times; and in response to determining that the placement function has been run, to identify the destination computing device for the particular unit of data, less than the particular number of times, performing the placement function on the particular data identifier.

10. The method of claim 8, further comprising:

identifying a certain computing device of the plurality of computing devices as a destination computing device of a second unit of data;

wherein the second unit of data is uniquely identified, among all units of data stored on the distributed query processing system, by a second data identifier;

wherein identifying the certain computing device comprises:

determining whether the placement function has been run, to identify the destination computing device for the second unit of data, less than or equal to a particular number of times; and in response to determining that the placement function has been run, to identify the destination computing device for the second unit of data, the particular number of times:

identifying the certain computing device to be the destination computing device of the second unit of data based, at least in part, on information that indicates that the certain computing device is available to store the second unit of data, and including information mapping the second unit of data to the certain computing device in an exception map stored at a supervisor computing device; and based on identifying the certain computing device, causing the second unit of data to be stored on the certain computing device.

11. The method of claim 8, further comprising:

identifying a certain computing device of the plurality of computing devices as a destination computing device of a second unit of data;

wherein the second unit of data is uniquely identified, among all units of data stored on the distributed query processing system, by a second data identifier;

wherein identifying the certain computing device comprises:

performing a first performance of the placement function that is based, at least in part, on the second data identifier, wherein the first performance of the placement function comprises combining results of the two or more hash functions to produce second combined results, identifying a first unavailable computing device based on the second combined results, determining that the first unavailable computing device is not available to store the second unit of data, in response to determining that the first unavailable computing device is not available to store the second unit of data, performing a second performance of the placement function that is based, at least in part, on the second data identifier, wherein the second performance of the placement function comprises combining results of the two or more hash functions to produce third combined results, wherein the third combined results are different than the second combined results, identifying the certain computing device based on the third combined results, and determining that the certain computing device is available to store the second unit of data; and in response to determining that the certain computing device is available to store the second unit of data, causing the second unit of data to be stored on the certain computing device.

12. The method of claim 8, further comprising:

a supervisor computing device retrieving a certain unit of data from a certain computing device of the plurality of computing devices by:

retrieving information mapping an identifier of the certain unit of data to the certain computing device in an exception map stored at the supervisor computing device; and retrieving the certain unit of data from the certain computing device based on the retrieved information mapping the identifier of the certain unit of data to the certain computing device.

13. The method of claim 8, further comprising:

a supervisor computing device retrieving a certain unit of data from a certain computing device of the plurality of computing devices by:

determining that an exception map stored at the supervisor computing device does not include information mapping a certain data identifier that identifies the certain unit of data to any of the plurality of computing devices;

in response to determining that the exception map does not include information mapping the certain data identifier to any of the plurality of computing devices:

performing a second performance of the placement function based, at least in part, on the certain data identifier, wherein the second performance of the placement function comprises combining results of the two or more hash functions to produce second combined results, and identifying the certain computing device to be the destination computing device of the certain unit of data based on the second combined results; and based on identifying the certain computing device to be the destination computing device of the certain unit of data, retrieving the certain unit of data from the certain computing device.

14. The method of claim 8, further comprising:

the particular computing device retrieving a certain unit of data from a certain computing device of the plurality of computing devices by:

performing a second performance of the placement function based, at least in part, on a certain data identifier that identifies the certain unit of data;

wherein the second performance of the placement function comprises combining results of the two or more hash functions to produce second combined results;

identifying the certain computing device to be the destination computing device of the certain unit of data based on the second combined results; and based on identifying the certain computing device to be the destination computing device of the certain unit of data, retrieving the certain unit of data from the certain computing device.

15. One or more non-transitory computer-readable media storing one or more sequences of instructions which, when executed by one or more processors, cause:

identifying a particular computing device, of a plurality of computing devices, as a destination computing device of a particular unit of data;

wherein a distributed query processing system comprises the plurality of computing devices;

wherein each of the plurality of computing devices is configured with a data store;

wherein the particular unit of data is uniquely identified, among all units of data stored on the distributed query processing system, by a particular data identifier;

wherein identifying the particular computing device comprises:

performing a placement function, comprising two or more hash functions, based, at least in part, on the particular data identifier, wherein performance of the placement function comprises combining results of the two or more hash functions to produce combined results, and identifying the particular computing device to be the destination computing device of the particular unit of data based on the combined results; and based on identifying the particular computing device, causing the particular unit of data to be stored on the data store of the particular computing device.

16. The one or more non-transitory computer-readable media of claim 15, wherein the one or more sequences of instructions further comprise instructions, which, when executed by one or more processors, cause:

prior to performing the placement function, determining whether the placement function has been run, to identify the destination computing device for the particular unit of data, less than a particular number of times; and in response to determining that the placement function has been run, to identify the destination computing device for the particular unit of data, less than the particular number of times, performing the placement function on the particular data identifier.

17. The one or more non-transitory computer-readable media of claim 15, wherein the one or more sequences of instructions further comprise instructions, which, when executed by one or more processors, cause:

identifying a certain computing device of the plurality of computing devices as a destination computing device of a second unit of data;

wherein the second unit of data is uniquely identified, among all units of data stored on the distributed query processing system, by a second data identifier;

wherein identifying the certain computing device comprises:

determining whether the placement function has been run, to identify the destination computing device for the second unit of data, less than or equal to a particular number of times; and in response to determining that the placement function has been run, to identify the destination computing device for the second unit of data, the particular number of times:

identifying the certain computing device to be the destination computing device of the second unit of data based, at least in part, on information that indicates that the certain computing device is available to store the second unit of data, and including information mapping the second unit of data to the certain computing device in an exception map stored at a supervisor computing device; and based on identifying the certain computing device, causing the second unit of data to be stored on the certain computing device.

18. The one or more non-transitory computer-readable media of claim 15, wherein the one or more sequences of instructions further comprise instructions, which, when executed by one or more processors, cause:

identifying a certain computing device of the plurality of computing devices as a destination computing device of a second unit of data;

wherein the second unit of data is uniquely identified, among all units of data stored on the distributed query processing system, by a second data identifier;

wherein identifying the certain computing device comprises:

performing a first performance of the placement function that is based, at least in part, on the second data identifier, wherein the first performance of the placement function comprises combining results of the two or more hash functions to produce second combined results, identifying a first unavailable computing device based on the second combined results, determining that the first unavailable computing device is not available to store the second unit of data, in response to determining that the first unavailable computing device is not available to store the second unit of data, performing a second performance of the placement function that is based, at least in part, on the second data identifier, wherein the second performance of the placement function comprises combining results of the two or more hash functions to produce third combined results, wherein the third combined results are different than the second combined results, identifying the certain computing device based on the third combined results, and determining that the certain computing device is available to store the second unit of data; and in response to determining that the certain computing device is available to store the second unit of data, causing the second unit of data to be stored on the certain computing device.

19. The one or more non-transitory computer-readable media of claim 15, wherein the one or more sequences of instructions further comprise instructions, which, when executed by one or more processors, cause:

a supervisor computing device retrieving a certain unit of data from a certain computing device of the plurality of computing devices by:

retrieving information mapping an identifier of the certain unit of data to the certain computing device in an exception map stored at the supervisor computing device; and retrieving the certain unit of data from the certain computing device based on the retrieved information mapping the identifier of the certain unit of data to the certain computing device.

20. The one or more non-transitory computer-readable media of claim 15, wherein the one or more sequences of instructions further comprise instructions, which, when executed by one or more processors, cause:

a supervisor computing device retrieving a certain unit of data from a certain computing device of the plurality of computing devices by:

determining that an exception map stored at the supervisor computing device does not include information mapping a certain data identifier that identifies the certain unit of data to any of the plurality of computing devices;

in response to determining that the exception map does not include information mapping the certain data identifier to any of the plurality of computing devices:

performing a second performance of the placement function based, at least in part, on the certain data identifier, wherein the second performance of the placement function comprises combining results of the two or more hash functions to produce second combined results, and identifying the certain computing device to be the destination computing device of the certain unit of data based on the second combined results; and based on identifying the certain computing device to be the destination computing device of the certain unit of data, retrieving the certain unit of data from the certain computing device.

\* \* \* \* \*

UNITED STATES PATENT AND TRADEMARK OFFICE
CERTIFICATE OF CORRECTION

| | |
|---|---|
| PATENT NO. | : 9,842,148 B2 |
| APPLICATION NO. | : 14/704825 |
| DATED | : December 12, 2017 |
| INVENTOR(S) | : Zhang et al. |

It is certified that error appears in the above-identified patent and that said Letters Patent is hereby corrected as shown below:

In Column 16, Line 15, delete "pruning" and insert -- pruning. --, therefor.

Signed and Sealed this
Third Day of July, 2018

Andrei Iancu
*Director of the United States Patent and Trademark Office*